(12) United States Patent
Wang et al.

(10) Patent No.: US 11,496,907 B2
(45) Date of Patent: Nov. 8, 2022

(54) METHOD AND SYSTEM FOR INTERFERENCE CANCELLATION IN SPECTRUM SHARING RADIO ENVIRONMENTS

(71) Applicant: Verizon Patent and Licensing Inc., Basking Ridge, NJ (US)

(72) Inventors: Xin Wang, Morris Plains, NJ (US); Nischal Patel, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 70 days.

(21) Appl. No.: 17/139,099

(22) Filed: Dec. 31, 2020

(65) Prior Publication Data

US 2022/0210662 A1 Jun. 30, 2022

(51) Int. Cl.
*H04W 16/14* (2009.01)
*H04L 5/00* (2006.01)
*H04W 72/04* (2009.01)
*H04L 1/00* (2006.01)

(52) U.S. Cl.
CPC ........... *H04W 16/14* (2013.01); *H04L 1/0069* (2013.01); *H04L 5/0048* (2013.01); *H04W 72/042* (2013.01); *H04W 72/0453* (2013.01)

(58) Field of Classification Search
CPC ... H04W 72/042; H04W 24/10; H04W 16/14; H04W 84/045; H04W 72/0453; H04L 1/0026; H04L 1/0028; H04L 5/0048; H04L 1/0031; H04L 1/0069
See application file for complete search history.

(56) References Cited

U.S. PATENT DOCUMENTS

2019/0089498 A1\* 3/2019 Pelletier ............... H04W 72/042
2021/0045097 A1\* 2/2021 John Wilson ......... H04L 1/0028

\* cited by examiner

*Primary Examiner* — Dady Chery

(57) ABSTRACT

Systems and methods provide for receiving a cell signal of a frequency band via a 5G/New Radio (5G/NR) carrier, wherein a user device includes a 5G/NR modem and a 4G/Long Term Evolution (4G/LTE) modem; determining that the frequency band is a shared spectrum carrier; forwarding the cell signal from a radio frequency (RF) element of the user device to the 5G/NR modem and the 4G/LTE modem; using, based on the forwarded cell signal, the 4G/LTE modem to identify one or more RF signals from one or more cells, wherein the one or more RF signals include a 4G/LTE carrier in the frequency band; and directing the 4G/LTE modem to notify the 5G/NR modem of the one or more RF signals.

20 Claims, 5 Drawing Sheets

METHOD AND SYSTEM FOR INTERFERENCE CANCELLATION IN SPECTRUM SHARING RADIO ENVIRONMENTS

BACKGROUND

The ongoing development and design of future generation wireless networks (e.g., 3GPP Fifth Generation-New Radio (5G NR) networks)—to meet voice/data communications demand—involves the use of multiple available radio frequency (RF) bands, implements alternative radio access technologies (RATs), and defines new core network functions which provide a distinct experience relative to current or legacy wireless networks (e.g., 4G networks). However, the transition from such systems to 5G networks presents a challenge for network service providers, to concurrently support users of older technologies (e.g., 4G) and users of the new systems (e.g., 5G) within the limits of the available wireless spectrum.

DETAILED DESCRIPTION

Figure 1:
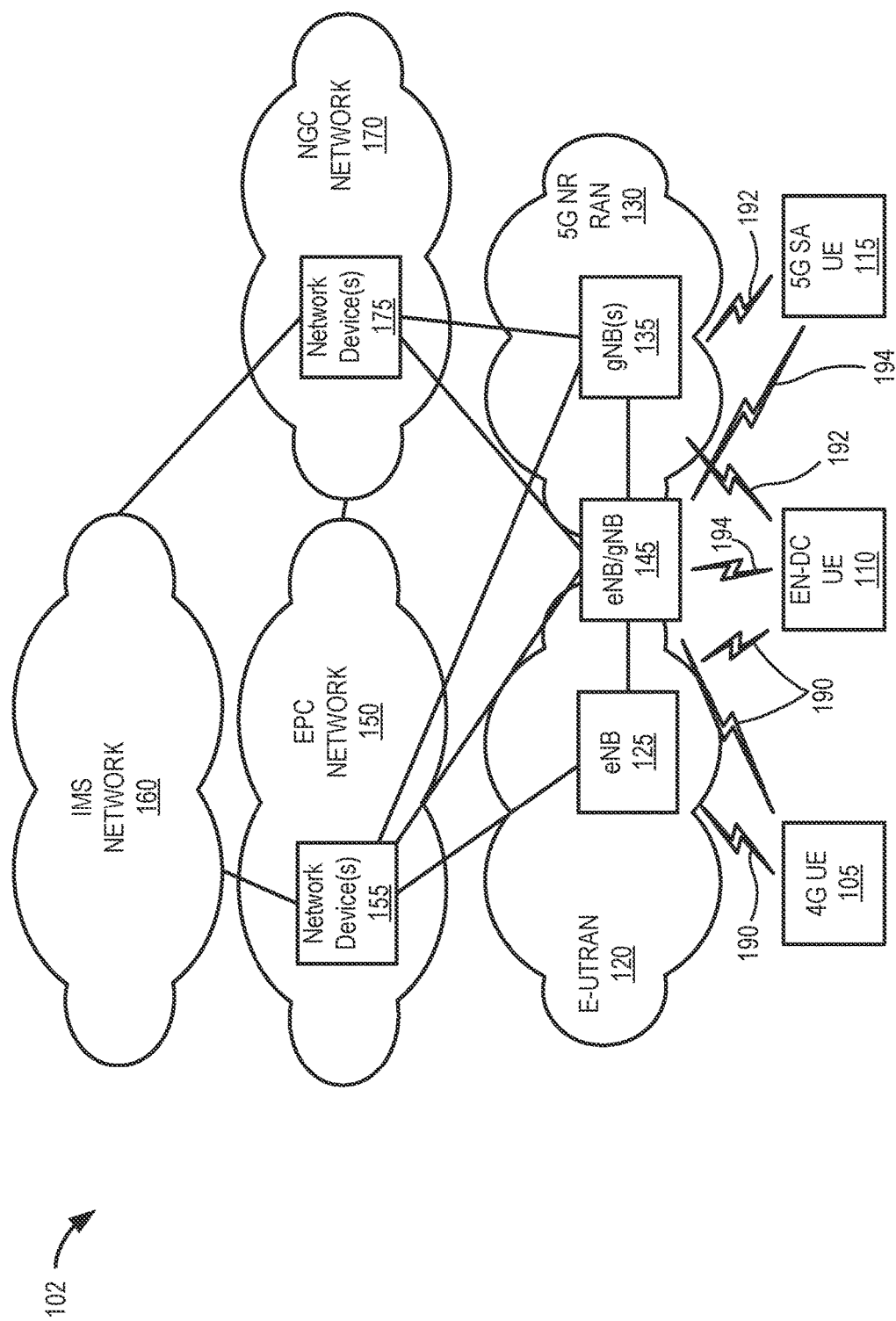
FIG. 1 is a diagram illustrating an exemplary spectrum sharing radio environment in which systems and methods described herein may be implemented.

The following detailed description refers to the accompanying drawings. The same reference numbers in different drawings may identify the same or similar elements. Also, the following detailed description does not limit the invention.

While new wireless networks, such as 5G NR networks and beyond, present opportunities for greater speeds, lower latency, and more connected devices than wireless networks based on earlier standards (e.g., 4G Long Term Evolution (4G-LTE)), 5G NR technology is not directly compatible with networks based on 4G LTE standards. Rather, 5G NR networks require radio access technology (RAT) and core network functions that are distinct from those currently used for 4G LTE networks. Nevertheless, 5G-capable end devices may continue to rely on 4G LTE carriers for wireless access due to the limited coverage areas of 5G NR cells, particularly during the build-out of the 5G infrastructure. As used herein, "carrier" may refer to a particular frequency band, or a discrete portion of a particular frequency band.

The ever-increasing demand for 5G NR services may be addressed through network densification with respect to existing infrastructures, which has led to an increase of radio link interference on both uplink (UL) and downlink (DL) radio interfaces. Traditional air interface optimization mitigation techniques may reduce signal interference somewhat, but such techniques have practical limits in their effectiveness for 5G serving cells that are subject to intra-frequency transmissions from neighboring 4G cells. A "serving cell" as used herein may be associated with a serving base station to which a user equipment (UE) is currently attached, while a "neighboring cell" may be associated with one or more neighboring base stations or one or more neighboring sectors of the serving cell of the serving base station that are "neighbors" in the sense that they are within physical proximity to the serving cell and/or to the UE. In this regard, signals from the neighboring cells may be "visible" to the UE, and may potentially cause interference in its operation.

In particular, the LTE cell-specific reference signal (CRS) is an always-on signal transmitted by serving and neighboring 4G LTE base stations. One approach to mitigate downlink interference is called CRS-interference cancellation ("CRS-IC"). CRS-IC uses existing network configuration information to inform UE (e.g., mobile devices) about the type of CRS patterns used by the UE's potential interferers (e.g., neighboring cells that operate at the same frequency as the UE). In accordance with CRS-IC, the UE may use the information to process the interfering cell signal patterns to offset the interfering signal, and thus to mitigate the interference (also referred as "interference cancellation" (IC)). Currently, however, implementation of the CRS-IC solution is not available to 5G NR interfaces in dynamic spectrum sharing (DSS) deployments, as discussed below.

Some 5G NR coverage may rely on a spectrum currently designated for 4G LTE connections (e.g., a shared spectrum), while other 5G NR coverage may use a much higher frequency spectrum (e.g., gigahertz (GHz) frequencies such as centimeter wave or millimeter wave, referred to herein as mmWave NR, or simply mmWave). The shared spectrum designated for 4G LTE may be statically or dynamically shared with 5G NR. In contrast with cell sizes for lower frequency bands (e.g., megahertz (MHz) frequencies, which may cover several miles), cell sizes for mmWave NR are typically smaller. Thus, use of lower frequency bands may be used to provide continuous 5G NR coverage (e.g., using a combination of lower frequency band cells and mmWave cells). Limited availability of wireless spectrum precludes simply assigning a dedicated 5G spectrum to lower frequency bands. Instead, a lower frequency 5G spectrum may gradually replace the 4G spectrum over time as the use of 5G-capable end devices surpasses the use of 4G-capable end devices. The lower frequency bands are particularly susceptible to intra-frequency interference due to their propagation properties.

Dual connectivity (DC) solutions are employed when end devices (e.g., user equipment (UE)) can connect to different radio access technology (RAT) types concurrently or to different frequencies in the same RAT. For example, a UE may connect concurrently to a 5G NR radio access network (RAN) and an Evolved Universal Mobile Telecommunications System (UMTS) Terrestrial Radio Access Network (E-UTRAN) of a 4G-LTE network. In such cases, downlink and uplink packets can be transmitted over one or both of the RATs. Thus, an EN-DC UE may connect concurrently to 5G NR and E-UTRAN for different bearers (e.g., different logical channels with particular end-to-end quality of service (QoS) requirements) or even split bearers.

Systems and methods provided herein configure a 4G LTE modem and a 5G NR modem of an EN-DC UE to perform a set of operations for interference mitigation in NR carriers. In some embodiments, the EN-DC UE may receive, in a serving cell, a cell signal in a frequency band via a 5G NR carrier and upon determining that the 5G NR carrier is a DSS carrier, the EN-DC UE may forward the cell signal to not just the 5G NR modem, but the 4G LTE modem as well. In response, the 4G LTE modem may scan signals to detect a presence of RF signals from one or more neighboring cells. When the 4G LTE modem determines that the RF signals include a 4G LTE carrier in a same RF spectrum as the 5G NR carrier, the 4G LTE modem notifies the 5G NR modem of the presence of the RF signals, enabling the 5G NR modem to perform LTE CRS interference cancelation to "clean" the serving cell of intra-frequency signaling, such as cell-specific reference signals (CRS) from neighboring cells. The system and methods provide a UE-based technique for cancellation of intra-frequency interference from neighboring cell LTE signal in 5G NR carriers.

FIG. 1 is a diagram illustrating an exemplary multi-RAT dual connectivity network environment in which systems and methods described herein may be implemented. In particular, FIG. 1 is a diagram of an exemplary network environment 102 for introducing dynamic spectrum sharing (DSS) for 4G LTE and 5G NR connections. As shown in FIG. 1, network environment 102 may include 4G-capable UE 105, Evolved Universal Mobile Telecommunications System (UMTS) Terrestrial Radio Access (E-UTRA)—5G New Radio (NR) Dual Connectivity (EN-DC)-capable UE 110, a 5G standalone (SA) UE 115, an E-UTRA network including one or more evolved Node B (eNB) 125, a 5G NR RAN 130 including one or more next generation Node B (gNB) 135, one or more combined eNB/gNBs 145, an evolved packet core (EPC) network 150 with network devices 155, an Internet Protocol (IP) multimedia subsystem (IMS) network 160, and a next generation core (NGC) network 170 with network devices 175. 4G UE 105, EN-DC UE 110, and 5G SA UE 115 may be collectively referred to herein as "end devices 105/110/115" or generically as "end device 105/110/115." Similarly, eNB 125, gNB 135, and eNB/gNB 145 may be collectively referred to herein as "wireless stations 125/135/145" or generically as "wireless station 125/135/135." According to other embodiments, environment 102 may include additional networks, fewer networks, and/or different types of networks than those illustrated and described herein.

Environment 102 includes links between the networks and between the devices. Environment 102 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 102 are exemplary.

In the configuration of FIG. 1, 4G UE 105 may use a wireless channel 190 to access E-UTRAN 120. Wireless channel 190 may correspond, for example, to physical layer protocols in accordance with 4G radio access technology. More particularly, for example, a wireless channel 190 may correspond to physical layer protocols for 4G RAN standards. EN-DC UE 110 may use wireless channels 190, 192, and 194 to access E-UTRAN 120 and/or 5G NR RAN 130. 5G SA UE 115 may use wireless channels 192 and 194 to access 5G NR RAN 130. According to implementations described herein, 4G UE 105, EN-DC UE 110, and/or 5G SA UE 115 may support carrier aggregation of more than one carrier frequency band for uplink and/or downlink transmissions.

Wireless channels 192 may correspond, for example, to physical layer protocols in accordance with 5G RAT. More particularly, for example, wireless channel 192 may correspond to physical layer protocols for 5G NR standards. Wireless channels 190/192 may be used to provide communications to/from EN-DC UE 110 using dual-connectivity with different bearers and/or split bearers. Similar to wireless channels 192, wireless channels 194 may correspond to physical layer protocols in accordance with 5G radio access technology. However, in contrast with the radio frequencies of wireless channels 192, wireless channel 194 may use lower frequency bands (e.g., shared with 4G). Wireless channels 192/194 may be used to provide communications to/from 5G SA UE 115 using dual connectivity with different bearers and/or split bearers.

4G UE 105 may include a computational device that is capable of communicating with E-UTRAN 120. 4G UE 105 may enable a user to access EPC network 150 and/or interact with devices in IMS network 160 or another type of application layer network. 4G UE 105 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

EN-DC UE 110 may include a computational device having multiple coverage mode capabilities, and thus the capability to communicate simultaneously with different wireless stations (e.g., eNB 125, gNB 135, eNB/gNB 145, etc.) using different wireless channels (e.g., channels 190/192/194) corresponding to the different RANs (e.g., E-UTRAN 120 and 5G NR RAN 130). Thus, EN-DC UE 110 may be referred to herein as an EN-DC-capable end device when distinguishing from an end device that is not EN-DC-capable, such as 4G UE 105. EN-DC UE 110 may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities (e.g., wireless communication mechanisms such as Wi-Fi). In other implementation, EN-DC UE 110 may be implemented as a machine-type communications (MTC) device, an Internet of Things (IoT) device, a machine-to-machine (M2M) device, etc.

Similar to EN-DC UE 110, 5G SA UE 115 may include a computational or communication device having multiple coverage mode capabilities, and thus the capability to communicate simultaneously with different wireless stations (e.g., gNB 135, eNB/gNBs 145, etc.) using different wireless channels (e.g., channels 192/194) corresponding to 5G NR RAN. Similar to EN-DC UE 110, 5G SA UE 115 may be configured to use, among other channels, wireless channel 194 with lower frequency bands for 5G.

eNB 125 may include a network device that has computational and wireless communication capabilities. In some instances, eNB 125 may be referred to as a "wireless station." eNB 125 may include a transceiver system and other components that allow 4G UE 105 to wirelessly connect to E-UTRAN 120 and core network 140. eNB 125 may interface with EPC network 150 via an S1 interface, for example.

gNB 135 may include a network device and other components that allow EN-DC UE 110 to wirelessly connect to 5G NR RAN 130 and EPC network 150. According to one implementation, gNB 135 may use dedicated radio frequencies (e.g., wireless channels 192) that are distinct from lower frequency bands used for 4G (e.g., wireless channels 190).

In one implementation, gNB 135 may interface with EPC network 150 via an S1 interface. gNB 135 may include a network device and other components that allow 5G SA UE 115 to connect to 5G NR RAN 130, using 5G frequency bands. Combined eNB/gNB 145 may include a network device and other components that allow 5G SA UE 115 to wirelessly connect to 5G NR RAN 130 and NGC network 170. According to one implementation, eNB/gNBs 145 may use portions of the lower frequency bands (e.g., wireless channels 194 for 5G communications) that are part of (but distinct from) the lower frequency bands allocated for 4G communications (e.g., wireless channels 190). For example, in one implementation, eNB/gNBs 145 may be configured to dynamically allocate portions of allocated spectrum for 4G and 5G connections. As used herein, "NR shared spectrum" may refer to lower frequency bands (in comparison to mmWave frequencies) allocated for 5G, and "4G shared spectrum" may refer to lower frequency bands allocated for 4G. In one implementation, eNB/gNBs 145 may interface with EPC network 150 via an S1 interface and interface with NGC network 170 via an NG interface.

Combined eNB/gNB 145 may include a network device and other components that allow EN-DC UE 110 to wirelessly connect to 5G NR RAN 130 and NGC network 170. According to one implementation, eNB/gNBs 145 may use static portions of some lower frequency bands that are part of (but distinct from) the lower frequency bands allocated for 4G communications (e.g., wireless channels 190). Additionally, eNB/gNB 145 may be configured to dynamically allocate shared spectrum between 4G and 5G channels (e.g., channels 194) for other frequency bands. For example, in one implementation, eNB/gNBs 145 may be configured to statically allocate Band 5 frequencies and dynamically allocate Bands 2 and 66 for different 4G and 5G connections.

EPC network 150 may include one or multiple networks of one or multiple types. According to an exemplary implementation, EPC network 150 includes a complementary network pertaining to multiple RANs. For example, EPC network 150 may include the core part of an LTE network, an LTE-Advanced (LTE-A) network, an LTE-A Pro network, a legacy network, and so forth. Depending on the implementation, EPC network 140 may include various network elements that may be implemented in network devices 155. Such network elements may include a mobility management entity (MME), a packet data network gateway (PGW), a serving gateway (SGW), a policy charging rules function (PCRF), a home subscriber server (HSS), as well other network elements pertaining to various network-related functions, such as billing, security, authentication and authorization, network polices, subscriber profiles, and/or other network elements that facilitate the operation of EPC network 150.

IMS network 160 may include a network for delivering IP multimedia services and may provide media flows between end devices 105/110/115 and external IP networks or other networks (not shown in FIG. 1). IMS network 160 may include devices and/or functions to support voice calls, data calls, and other applications for end devices.

NGC network 170 may include a core network to support standalone 5G standards. For example, NGC network 170 may include various network devices 175 that support the core part of a next generation network. By way of further example, NGC network 170 may include a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and a charging system (CS). According to other exemplary embodiments, the next generation core network may include additional, different, and/or fewer network devices than those described.

FIG. 1 provides an overview of network arrangements to gradually implement 5G networks. Radio resource control (RRC) may be considered a protocol for handling signaling between an end device 105/110/115 and a radio access network (e.g., E-UTRAN 120 and/or 5G NR RAN 130). RRC states (e.g., "idle mode," "connected mode") may be handled, for example, at a control plane which includes an RRC layer. A "cell" as used herein may include a coverage area served by a wireless station (e.g., one of eNBs 125, gNB 135, or eNB/gNB 145) using a particular frequency band. Thus, in some cases, a cell and the wireless station servicing the cell may be referred to interchangeably. In some implementations, end devices 105/110/115 may be separate devices, or alternatively, may include logical functionalities, e.g., one physical end device may operate as a 4G UE, or EN-DC UE, or 5G SA UE, or other type of UE, based on a current location relative to network coverage and/or network configuration.

Figure 2:
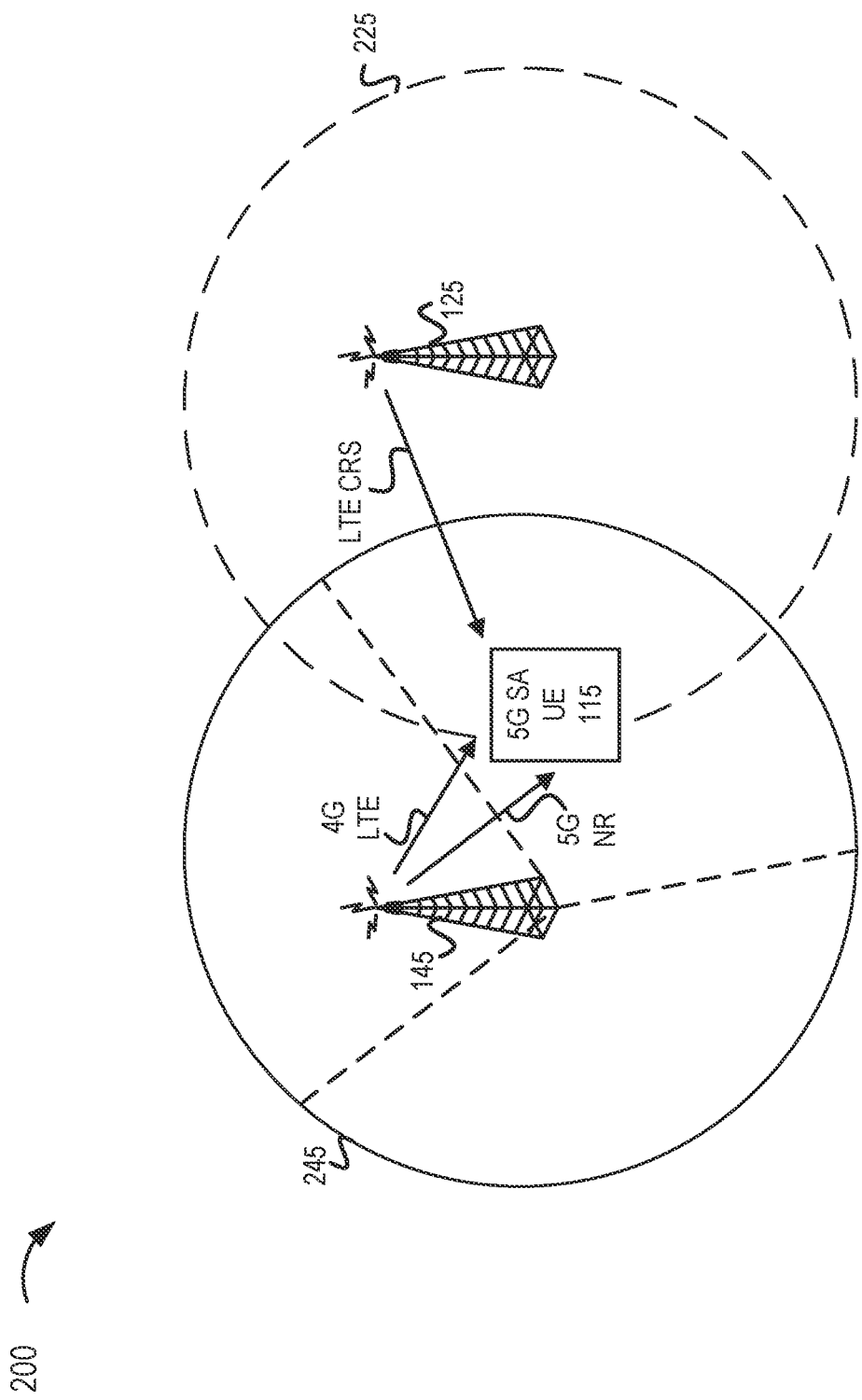
FIG. 2 is a diagram illustrating an exemplary serving cell and neighboring cell(s) in a portion of the network environment of FIG. 1.

FIG. 2 is a diagram of a radio environment 200 in which 5G SA UE 115 and/or EN-DC UE 110 may operate. As shown, 5G SA UE 115 may be connected to a serving cell 245 associated with serving eNB/gNB 145 via wireless channel 194 at a location that is also proximate to a neighboring cell 225 associated with eNB 125 or a non-serving eNB/gNB 145. In one embodiment, serving cell 245 may provide dynamic spectrum sharing (DSS) in which 4G LTE carriers and 5G NR carriers are dynamically allocated resources from eNB/gNB 145 within a same RF frequency but in different time and/or frequency domains, e.g., slots and/or physical resource blocks, and by configuring so-called cell-specific reference signal (CRS) rate matching on the NR carrier. The detection of CRS rate matching patterns indicates a DSS environment and is used to avoid interference between 4G LTE and 5G NR connections to eNB/gNB 145.

As shown in FIG. 2, 5G SA UE 115 may be located near/within a coverage area of cell 225 associated with one or more neighboring eNBs 125 and/or non-serving eNB/gNBs 145. In this case, the air interface encountered by 5G SA UE 115 may include radio signals from eNB 125 and/or non-serving eNB/gNBs 145 that may be in the same frequency as the 4G LTE carrier and/or the 5G NR carrier via which 5G SA UE 115 is attached to serving eNB/gNB 145. For example, eNB 125 and/or non-serving eNB/gNBs 145 may transmit an always-on LTE CRS that causes intra-frequency interference at 5G SA UE 115. In a scenario in which a 4G LTE carrier is used to connect to eNB/gNB 145, 5G SA UE 115 may perform LTE CRS-interference cancellation (CRS-IC) to mitigate the intra-frequency interference. In another scenario in which 5G SA UE 115 uses an NR connection to eNB/gNB 145, a device-based method for LTE CRS-IC is introduced herein.

As indicated above, FIG. 2 is provided as an example. Other examples are possible and can differ from what was described with regard to FIG. 2. For example, multiple neighboring cells 225 may have overlapping coverage areas in which EN-DC UE 110 may move in and out of while maintaining a connection to eNB/gNB 145. Referring to FIG. 2, exemplary connections are shown when UE 110 is in a coverage area 245 (e.g., serviced by eNB/gNB 145) with NR shared spectrum for 5G. According to various implementations, eNB/gNB 145 may include one or multiple sectors associated with one or more antenna arrays and beamforming techniques (represented by the three dashed lines dividing serving cell 245 into three sectors). In some implementations, the intra-frequency interference at 5G SA UE 115 (or other UE type) may be associated with LTE CRS transmissions from a neighboring sector.

Figure 3:
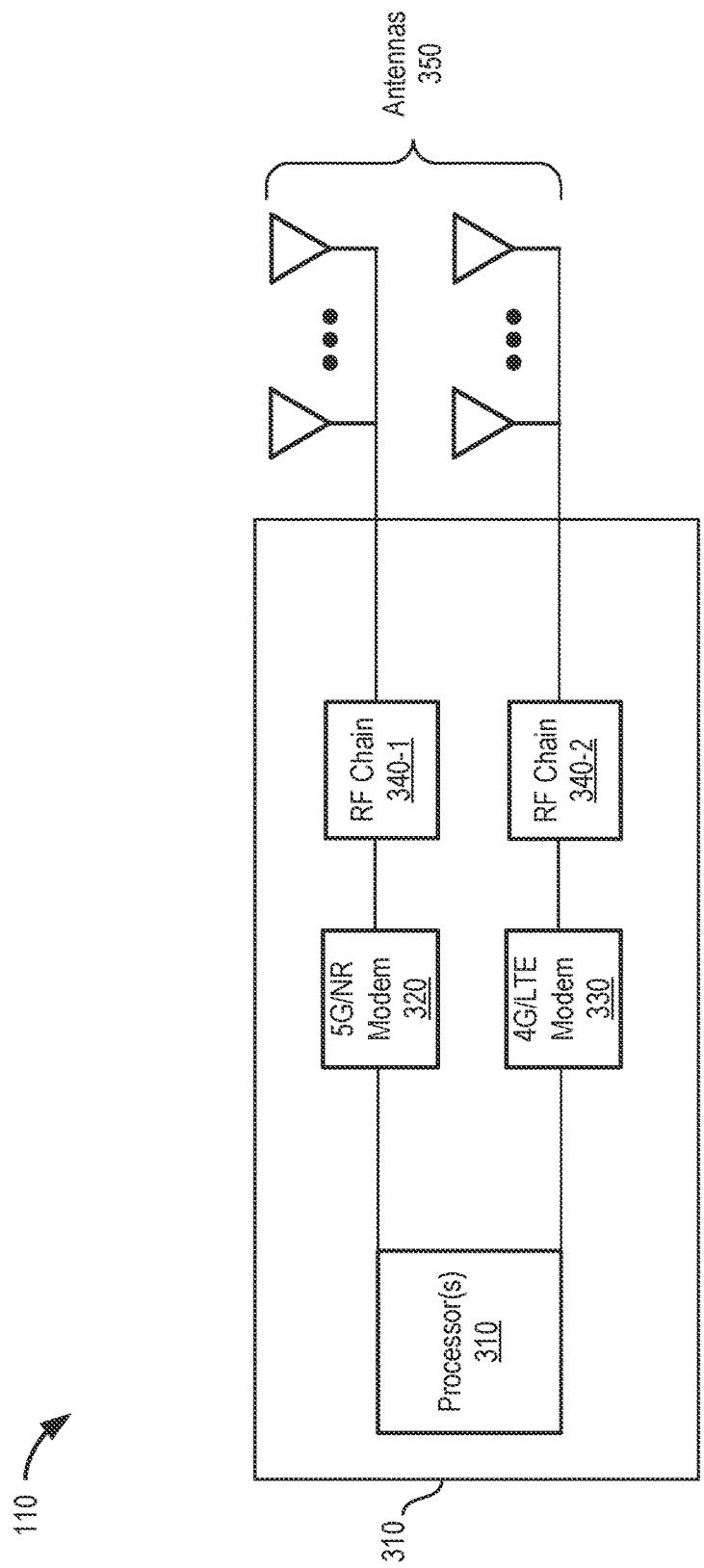
FIG. 3 is a diagram illustrating exemplary UE elements for enabling communication in a multi-RAT dual connectivity environment.

FIG. 3 is a diagram of exemplary components of EN-DC UE 110 that is capable of communicating using EN-DC. As shown, EN-DC UE 110 may include one or more processors 310. Processor 310 may include processor 420 shown in FIG. 4. In some implementations, processor 310 may include, for example, a transmit processor, a controller/processor, a receive processor, a transmit multiple-input multiple-output (TX MIMO) processor, a receive MIMO (RX MIMO) processor, and/or the like. Processor 310 can perform baseband processing of communications received via a 4G/LTE connection and via a 5G/NR connection. In some aspects, the 4G/LTE connection may be associated with a first processor 310 and the 5G/NR connection may be associated with a second processor 310.

As shown, EN-DC UE 110 includes a 5G/NR modem 320 that may perform processing, modulation, demodulation, and/or the like for 5G/NR communications of EN-DC UE 110. As further shown, EN-DC UE 110 includes a 4G/LTE modem 330 that may perform processing, modulation, demodulation, and/or the like for 4G/LTE communications of EN-DC UE 110. In some implementations, 5G/NR modem 320 and 4G/LTE modem 330 may be separate components. In some implementations, 5G/NR modem 320 and 4G/LTE modem 330 may be included in the same component.

As shown, EN-DC UE 110 includes radio frequency (RF) chains 340-1 and 340-2 (collectively, "RF chain 340") that may be used for 5G/NR communications of EN-DC UE 110 and 4G/LTE communications of EN-DC UE 110, respectively. In some implementations, RF chain 340 may perform encoding, decoding, serialization, parallelization, mapping, transformation, guardband insertion or removal, signal upconversion/downconversion, signal amplification, signal filtering (e.g., interference cancelation), scanning, and/or the like. According to implementations described herein, RF chain 340 may forward a baseband NR signal to both 5G/NR modem 320 and 4G/LTE modem 330 as described further herein. In one embodiment EN-DC UE 110 may, when operating in standalone (SA) mode and in response to receiving the baseband signal, activate RF chain 340-2 and/or 4G/LTE modem 330. In some implementations, an RF chain 340 may be used for both 4G/LTE and 5G/NR.

As further shown, EN-DC UE 110 may include antennas 350. For example, the 5G/NR connection associated with 5G/NR modem 320 may be associated with one or more antennas 350 and the 4G/LTE connection associated with 4G/LTE modem 330 may be associated with one or more antennas 350. In some implementations, EN-DC UE 110 may be associated with a plurality of antennas 350, such as one or more arrays or sub-arrays of antennas. In some implementations, antenna 350 can be considered to be a part of RF chain 340. In some implementations, antenna 350 may be shared between 4G/LTE and 5G/NR.

As indicated above, FIG. 3 is provided as an example. Other examples are possible and can differ from what was described with regard to FIG. 3.

Figure 4:
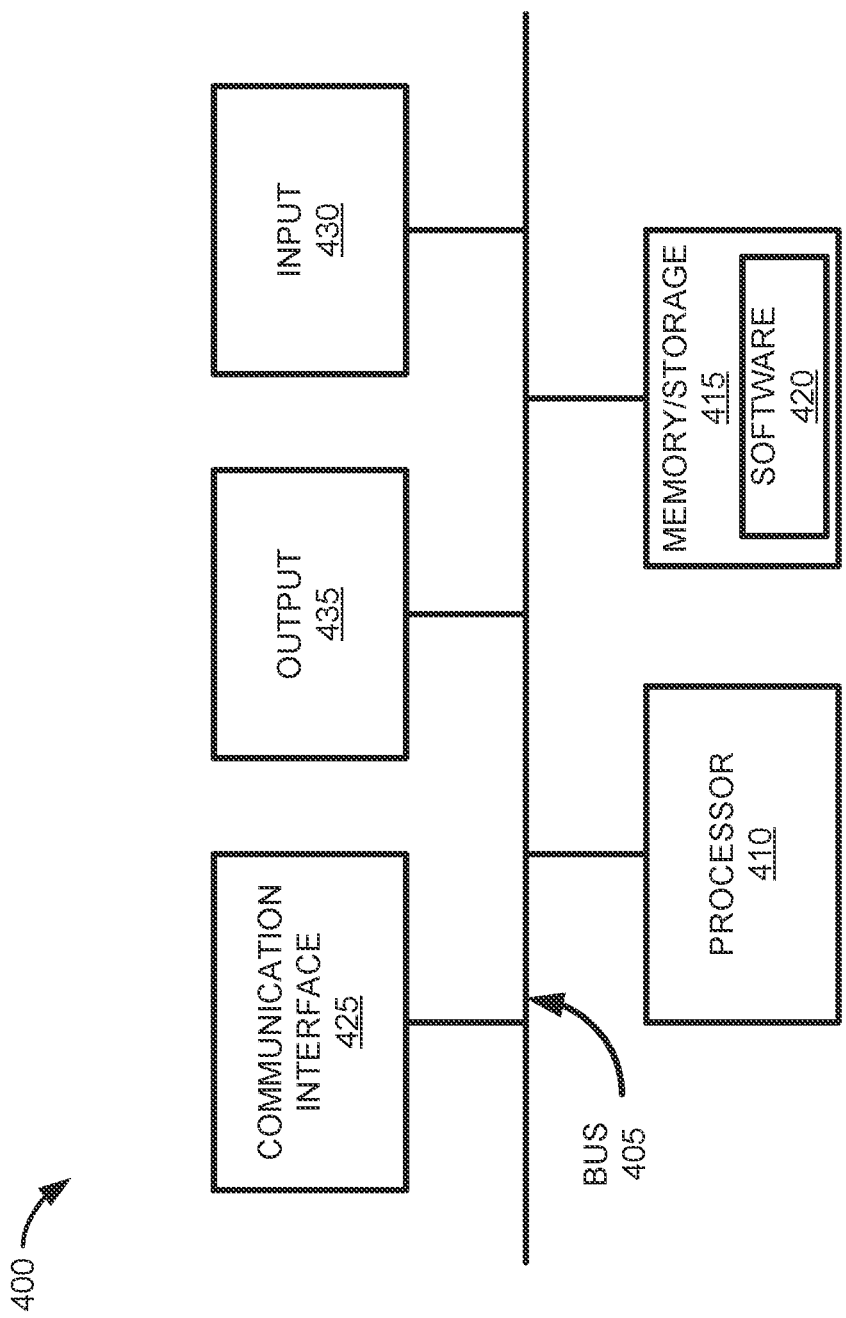
FIG. 4 is a diagram illustrating exemplary components of a device that may correspond to one or more of the devices illustrated and described herein.

FIG. 4 is a diagram illustrating exemplary components of a device 400 that may correspond to one or more of the devices described herein. For example, device 400 may correspond to components included in end device 105/110/115, wireless stations 125/135/145, network devices 155, or network devices 175. As illustrated in FIG. 4, according to an exemplary embodiment, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, and/or clocks.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may be a dedicated component or a non-dedicated component (e.g., a shared resource).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may include an operating system. Software 420 is also intended to include firmware, middleware, microcode, hardware description language (HDL), and/or other forms of instruction. Additionally, for example, end device 110 may include logic to perform tasks, as described herein, based on software 420.

Communication interface 425 permits device 400 to communicate with other devices, networks, systems, devices, and/or the like. Communication interface 425 includes one or multiple wireless interfaces and/or wired interfaces. For example, communication interface 425 may include one or multiple transmitters and receivers, or transceivers. Communication interface 425 may include one or more antennas. For example, communication interface 425 may include an array of antennas. Communication interface 425 may operate according to a protocol stack and a communication standard. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 435 permits an output from device 400. For example, output 435 may include a speaker, a display, a light, an output port, and/or some other type of visual, auditory, tactile, etc., output component. According to some embodiments, input 430 and/or output 435 may be a device that is attachable to and removable from device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
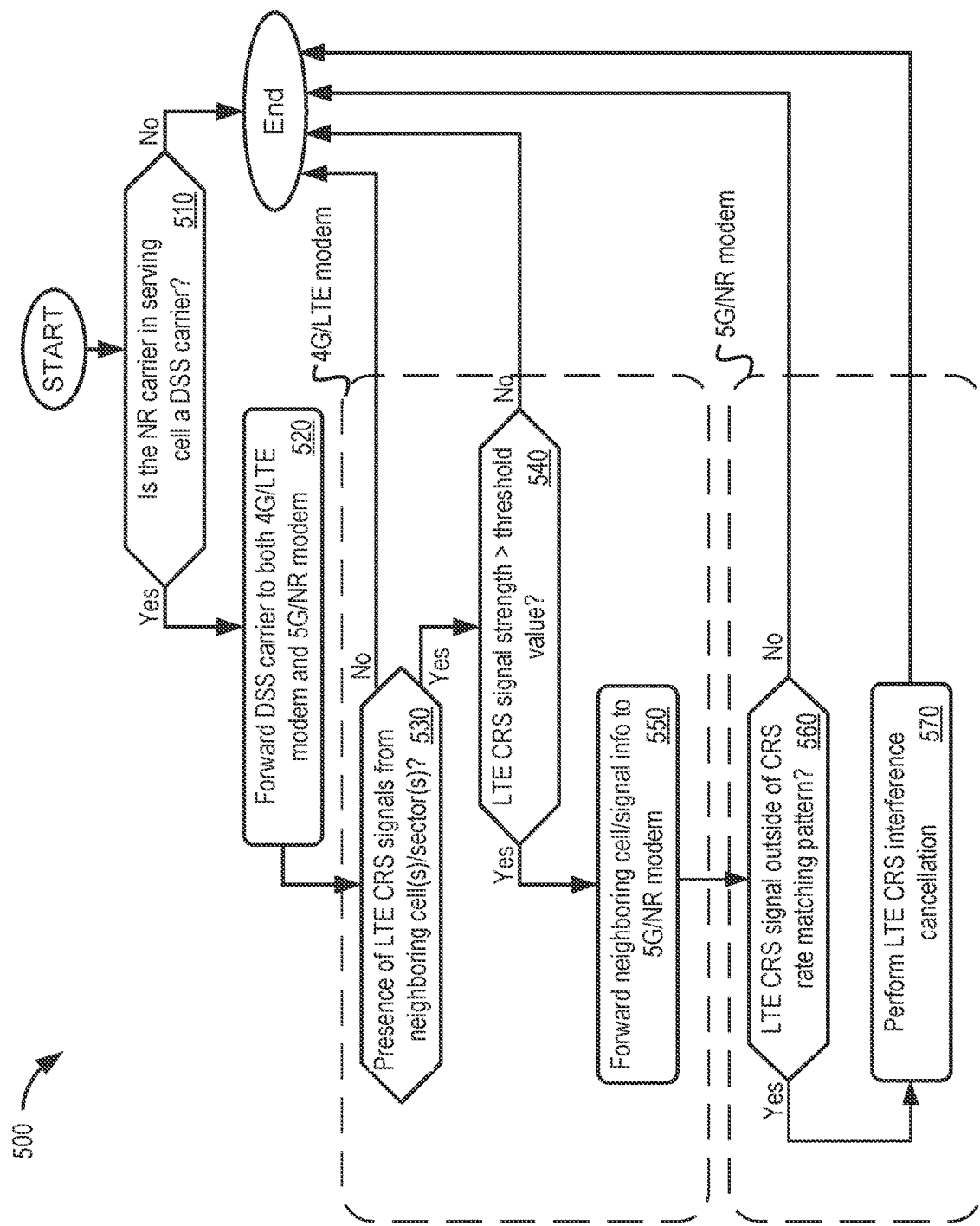
FIG. 5 is a flow diagram illustrating an exemplary process for enabling interference cancellation in LTE/NR dynamic spectrum sharing (DSS), according to an implementation described herein.

FIG. 5 is a flow diagram illustrating an exemplary process 500 for implementing interference cancellation in an LTE/NR DSS environment, according to an implementation described herein. According to an exemplary embodiment, an end device (e.g., EN-DC UE 110, 5G SA UE 115, etc.) may perform steps of process 500. For example, processor 410 executes software 420 to perform the steps illustrated in FIG. 5, and described herein. In another embodiment, and end device may perform steps of process 500 in conjunction with one or more network devices and/or customer premises equipment (CPE), such as a small cell (e.g., femtocell).

Assume that EN-DC UE 110 is operating in a non-standalone (NSA) mode in a service cell. Referring to FIG. 5, a determination may be made whether an NR carrier (e.g., Band n5) received (e.g., via antennas 350) by EN-DC UE 110 is a DSS carrier (block 510). For example, EN-DC UE 110 may detect a CRS rate matching pattern in serving cell 245. As another example, EN-DC UE 110 may identify the NR carrier as a DSS carrier if none of NR physical downlink control channel (PDCCH) configurations start from Symbol Number 0. Other information may be used to make the determination. Upon a determination that the NR carrier is not a DSS carrier (block 510—No), process 500 may end.

Upon a determination that the NR carrier is a DSS carrier (block 510—yes), RF chain 340 (e.g., RF chain 340-1) may forward the DSS carrier to both 5G/NR modem 320 and 4G/LTE modem 330 (block 520). For example, processor 310 may direct that the DSS carrier be selectively forwarded to 4G/LTE modem as well. Upon receiving the DSS carrier, 4G/LTE modem 330 may determine whether the local RF environment at a location of EN-DC 110 includes signals from sources other than the serving cell (block 530). For example, 4G/LTE modem 330 may process LTE primary synchronization signals (PSS) and/or secondary synchronization signals (SSS) on the DSS carrier, to identify neighboring LTE cells (Physical Cell ID). Upon a determination that LTE CRS signals from a neighboring cell(s)/sector(s) are not present in serving cell 245 (block 530—No), process 500 may end.

Upon a determination that LTE CRS signals are present in serving cell 245 (block 530—yes), 4G/LTE modem 330 may determine whether the measured signal strengths exceed a configurable signal threshold value (block 540). For example, the signal threshold value may be set to correspond to a signal strength that is likely to result in substantial interference with RF transmissions to/from EN-DC UE 110. Upon a determination that the LTE CRS signals are of a signal strength that is not likely to cause interference (i.e., threshold value not exceeded) (block 540—No), process 500 may end.

Upon a determination that the LTE CRS signals are of a signal strength that is likely to cause interference (i.e., threshold value exceeded) (block 540—Yes), 4G/LTE modem 330 may forward the neighboring cell information and/or the LTE CRS signal information to the 5G/NR modem 320 (block 550). Upon receiving the information forwarded from 4G/LTE modem 330, 5G/NR modem 320 may determine whether any of the LTE CRS signals are not included in the CRS rate matching pattern configured by eNB/gNB 145 (block 560). For example, 5G/NR modem 320 may identify slots where the CRS rate matching is applied to NR physical downlink shared channel (PDSCH). Upon a determination that the LTE CRS signals are contained entirely within the CRS rate matching pattern (block 560—No), process 500 may end.

Upon identifying at least one LTE CRS is not contained entirely within the CRS rate matching pattern (block 560—Yes), 5G/NR modem 320 may perform LTE CRS-IC outside of the configured CRS rate matching pattern (block 570). Upon performing the LTE CRS-IC, process 500 may end.

Additionally, or alternatively, the neighboring cell 225 information may be maintained by a network device (e.g., network devices 155, network devices 175, etc.) and provided to EN-DC UE 110 upon request. For example, 5G/NR modem 320 and/or 4G/LTE modem 330 may use physical cell ID (PCI) corresponding to one or more of neighboring cells 225 to determine a presence of interfering CRS signals in serving cell 245. In one embodiment, 5G/NR modem 320 and/or 4G/LTE modem 330 may compare the stored information for one or more neighboring cells 225 to local RF conditions acquired by 4G/LTE modem 330, to determine whether CRS-IC is to be performed. In other embodiments, interference determination associated with one or more neighboring cells 225 may be made using acquired RF information and interference determination associated with one or more neighboring cells 225 may be made using information that is stored for an identified neighboring cell 225.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 5 the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information provided by individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A user device comprising:
   a processor configured to:
   receive a cell signal of a frequency band via a 5G/New Radio (5G/NR) carrier, wherein the user device includes a 5G/NR modem and a 4G/Long Term Evolution (4G/LTE) modem;
   determine that the frequency band is a shared spectrum carrier;
   forward the cell signal from a radio frequency (RF) element of the user device to the 5G/NR modem and the 4G/LTE modem;
   use, based on the forwarded cell signal, the 4G/LTE modem to identify multiple RF signals from one or more cells, wherein the RF signals include a 4G/LTE carrier in the frequency band;
   measure a strength of each of the RF signals relative to a signal strength threshold; and
   direct the 4G/LTE modem to selectively notify the 5G/NR modem of first RF signals, of the multiple RF signals, exceeding the signal strength threshold, and selectively not notify the 5G/NR modem of second RF signals, of the multiple RF signals, not exceeding the signal strength threshold.

2. The user device of claim 1, wherein the one or more RF signals comprise LTE cell-specific reference signals (CRS), and the processor is further configured to:
   enable the 5G/NR modem to perform LTE CRS interference cancelation responsive to the notification.

3. The user device of claim 1, wherein to determine that the frequency band is a shared spectrum carrier, the processor is further configured to:
   determine that at least one cell-specific reference signals (CRS) rate matching pattern is applied to the user device; or
   determine that no NR physical downlink control channels (PDCCHs) begin with Symbol Number 0 (zero).

4. The user device of claim 1, wherein the processor is further configured to:
set the signal strength threshold to a value that corresponds to a signal strength that is likely to cause interference with RF transmissions to/from the user device.

5. The user device of claim 1, wherein to identify the multiple RF signals, the processor is further configured to identify the first RF signals that interfere with the cell signal of the frequency band via the 5G/NR carrier and the first RF signals that do not interfere with the cell signal of the 5G/NR carrier, and
wherein to notify the 5G/NR modem, the processor is further configured to selectively notify the 5G/NR modem of the first RF signals that interfere with the cell signal of the 5G/NR carrier.

6. The user device of claim 1, wherein the processor is further configured to:
determine that the user device is operating in a standalone mode; and
activate, prior to the forwarding, the 4G/LTE modem based on the determination that the user device is operating in the standalone mode.

7. The user device of claim 1, wherein the processor is further configured to:
apply at least one CRS rate matching pattern to the user device, and
wherein to identify the multiple RF signals, the processor is further configured to identify the 4G/LTE carrier that is not included in the CRS rate matching pattern.

8. The user device of claim 1, wherein to identify the one or more RF signals, the processor is further configured to:
obtain, from a network device, a list of the one or more cells based on a proximity to a serving cell.

9. A method, comprising:
receiving, by a user device, a cell signal of a frequency band via a 5G/New Radio (5G/NR) carrier, wherein the user device includes a 5G/NR modem and a 4G/Long Term Evolution (4G/LTE) modem;
determining, by the user device, that the frequency band is a shared spectrum carrier;
forwarding, by a radio frequency (RF) element of the user device based on the determining, the cell signal to the 5G/NR modem and the 4G/LTE modem;
identifying, by the 4G/LTE modem using the forwarded cell signal, multiple RF signals from one or more cells, wherein the RF signals include a 4G/LTE carrier in the frequency band;
measuring a strength of each of the RF signals relative to a signal strength threshold;
selectively notifying, by the 4G/LTE modem, the 5G/NR modem of first RF signals, of the multiple RF signals, exceeding the signal strength threshold; and
selectively not notifying the 5G/NR modem of second RF signals, of the multiple RF signals, not exceeding the signal strength threshold.

10. The method of claim 9, wherein the multiple RF signals comprise LTE cell-specific reference signals (CRS), the method further comprising:
performing, by the 5G/NR modem, LTE CRS interference cancelation responsive to the notifying.

11. The method of claim 10, wherein determining that the frequency band is a shared spectrum carrier comprises at least one of:
determining that at least one cell-specific reference signals (CRS) rate matching pattern is applied to the user device; or
determining that no NR physical downlink control channels (PDCCHs) begin with Symbol Number 0 (zero).

12. The method of claim 9, further comprising:
set the signal strength threshold to a value that corresponds to a signal strength that is likely to cause interference with RF transmissions to/from the user device.

13. The method of claim 9, wherein identifying the multiple RF signals comprises identifying the first RF signals that interfere with the cell signal of the frequency band via the 5G/NR carrier and the first RF signals that do not interfere with the cell signal of the 5G/NR carrier, and
wherein notifying the 5G/NR modem comprises selectively notifying the 5G/NR modem of the first RF signals that interfere with the cell signal of the 5G/NR carrier.

14. The method of claim 9, further comprising:
determining that the user device is operating in a standalone mode; and
activating, prior to the forwarding, the 4G/LTE modem based on the determination that the user device is operating in the standalone mode.

15. The method of claim 9, further comprising:
applying at least one CRS rate matching pattern to the user device, and
wherein identifying the multiple RF signals comprises identifying the 4G/LTE carrier that is not included in the CRS rate matching pattern.

16. The method of claim 9, wherein identifying the one or more RF signals comprises:
obtaining, from a network device, a list of the one or more cells based on a proximity to a serving cell.

17. A non-transitory, computer-readable storage medium storing instructions executable by a processor of a user device, which when executed cause the user device to:
receive a cell signal of a frequency band via a 5G/New Radio (5G/NR) carrier, wherein the user device includes a 5G/NR modem and a 4G/Long Term Evolution (4G/LTE) modem;
determine that the frequency band is a shared spectrum carrier;
forward the cell signal from a radio frequency (RF) element of the user device to the 5G/NR modem and the 4G/LTE modem;
use, based on the forwarded cell signal, the 4G/LTE modem to identify one or more RF signals from one or more cells, wherein the one or more RF signals include a 4G/LTE carrier in the frequency band;
measure a strength of each of the RF signals relative to a signal strength threshold; and
direct the 4G/LTE modem to selectively notify the 5G/NR modem of first RF signals, of the multiple RF signals, exceeding the signal strength threshold and selectively not notify the 5G/NR modem of second RF signals, of the multiple RF signals, not exceeding the signal strength threshold.

18. The non-transitory, computer-readable storage medium of claim 17, wherein the one or more RF signals comprise LTE cell-specific reference signals (CRS), the non-transitory, computer-readable storage medium further comprising instructions to:
enable the 5G/NR modem to perform LTE CRS interference cancelation responsive to the notification.

19. The non-transitory, computer-readable storage medium of claim 17, wherein to determine that the first frequency band is a shared spectrum carrier, the non-transitory, computer-readable storage medium further comprising instructions to:
- determine that at least one cell-specific reference signals (CRS) rate matching pattern is applied to the user device; or
- determine that no NR physical downlink control channels (PDCCHs) begin with Symbol Number 0 (zero).

20. The non-transitory, computer-readable storage medium of claim 17,
- wherein identifying the multiple RF signals comprises identifying the first RF signals that interfere with the cell signal of the 5G/NR carrier and the first RF signals that do not interfere with the cell signal of the 5G/NR carrier, and
- wherein notifying the 5G/NR modem comprises selectively notifying the 5G/NR modem of the first RF signals that interfere with the cell signal of the 5G/NR carrier.

\* \* \* \* \*